(12) United States Patent
Roesner et al.

(10) Patent No.: US 9,667,057 B2
(45) Date of Patent: May 30, 2017

(54) SYSTEM AND METHOD FOR PROTECTING A POWER CONVERTER DURING AN ADVERSE VOLTAGE EVENT

(71) Applicant: General Electric Company, Schenectady, NY (US)

(72) Inventors: Robert Roesner, Oberschleissheim (DE); Mathieu Giroux, Turgi (CH)

(73) Assignee: General Electric Company, Schenectady, NY (US)

( * ) Notice: Subject to any disclaimer, the term of this patent is extended or adjusted under 35 U.S.C. 154(b) by 394 days.

(21) Appl. No.: 14/307,896

(22) Filed: Jun. 18, 2014

(65) Prior Publication Data
US 2015/0372481 A1    Dec. 24, 2015

(51) Int. Cl.
| | |
|---|---|
| H02H 7/12 | (2006.01) |
| H02H 3/20 | (2006.01) |
| H02J 3/32 | (2006.01) |
| H02J 3/38 | (2006.01) |
| H02J 9/06 | (2006.01) |

(52) U.S. Cl.
CPC ............ *H02H 7/1216* (2013.01); *H02H 3/20* (2013.01); *H02J 3/32* (2013.01); *H02J 3/386* (2013.01); *H02J 9/062* (2013.01); *Y02B 10/72* (2013.01); *Y02E 10/763* (2013.01); *Y02E 70/30* (2013.01)

(58) Field of Classification Search
CPC .. H02J 9/062; H02J 3/386; H02J 3/32; H02H 7/1216; H02H 3/20
USPC ......................................................... 363/178
See application file for complete search history.

(56) References Cited

U.S. PATENT DOCUMENTS

| | | |
|---|---|---|
| 8,013,461 B2 | 9/2011 | Delmerico et al. |
| 8,432,055 B2 | 4/2013 | Grbovic |
| 2011/0025059 A1 | 2/2011 | Helle et al. |
| 2011/0215649 A1* | 9/2011 | Min .................... H02J 1/00 307/72 |
| 2012/0053750 A1 | 3/2012 | Viassolo et al. |

(Continued)

FOREIGN PATENT DOCUMENTS

WO    WO 2011/0025059    7/2011

OTHER PUBLICATIONS

Kim et al., Grid-Tied Power Converter for Battery Energy Storage Composed of 2-Stage DC-DC Converter, Journal of Electrical Engineering & Technology, vol. 8, No. 6, Nov. 2013, pp. 742-750.

(Continued)

*Primary Examiner* — Dharti Patel
(74) *Attorney, Agent, or Firm* — Dority & Manning, P.A.

(57) ABSTRACT

The present disclosure is directed to a system and method for protecting a power converter of a renewable energy power system and/or a stand-alone energy storage system connected to a power grid during an adverse voltage event, such as a high voltage ride through (HVRT) event. In one embodiment, the method includes monitoring, via a control system, a current-voltage parameter of the power converter, wherein the current-voltage parameter is indicative of an adverse voltage event occurring at the power grid. Another step includes transferring, via a switching power supply, energy from a DC link of the power converter to one or more energy storage devices of an energy storage system coupled to the power converter when the current-voltage parameter indicates that an adverse voltage event is occurring.

20 Claims, 6 Drawing Sheets

(56) References Cited

U.S. PATENT DOCUMENTS

2013/0241495 A1* 9/2013 Min .................... H02J 3/32
                                                        320/134

OTHER PUBLICATIONS

Feltes et al., High Voltage Ride-Through of DFIG-based Wind Turbines, IEEE, 2008.
Related U.S. Appl. No. 14/136,018, filed Dec. 20, 2013.

* cited by examiner

SYSTEM AND METHOD FOR PROTECTING A POWER CONVERTER DURING AN ADVERSE VOLTAGE EVENT

FIELD OF THE INVENTION

The present disclosure relates generally to power converters, and more particular to a system and method for protecting a power converter connected to a power grid during an adverse voltage event, such as a high voltage ride through (HVRT) event.

BACKGROUND OF THE INVENTION

A battery energy storage system (BESS) refers to a system used to store electricity on a large scale within an electrical power grid. For example, when production of electrical power systems exceeds consumption, the BESS is configured to store electrical energy. In this way, electrical energy production does not have to be drastically scaled up and down to meet momentary consumption. Rather, production can be maintained at a more constant level. Thus, electrical power systems can be more efficiently and easily operated at constant production levels.

The BESS can be a stand-alone system or may be incorporated into a renewable energy power system to provide energy storage capability. A stand-alone BESS is generally connected to a power grid via a switching power supply, such as a DC to AC power converter. Further, a typical stand-alone BESS includes one or more energy storage devices (e.g. batteries) coupled to the switching power supply via a DC link and a bridge circuit. Stand-alone BESSs can be used for peak shaving for commercial/industrial plants, buffering peak loads in distribution grids, energy trading, buffering solar power (e.g. at night time), upgrades for solar/wind power generation, and many other suitable applications.

Renewable energy power systems, such as wind energy power systems and solar energy power systems, also typically include a power converter with a regulated DC link much like a stand-alone BESS. For example, wind power systems, such as wind driven doubly-fed induction generator (DFIG) systems or full power conversion systems, typically include a power converter with an AC-DC-AC topology. Solar power systems typically include a power converter that has a DC-DC-AC topology or a single stage DC-AC topology. A BESS may be coupled to the DC link of the power converter of the renewable energy power system and can be used, for instance, to apply power to the DC link of the power converter during transient conditions or to obtain power from the DC link. A switching power supply can be provided to transfer energy back and forth between the DC link of the power converter and the BESS. For instance, the switching power supply is often a DC to DC converter configured to convert a first voltage on the DC link to a second voltage at the BESS, and vice versa. Further, it can be desirable for the switching power supply of the renewable energy power system to be bi-directional to allow not only for power flow from the BESS to the DC link during transient conditions but also to allow power flow from the DC link to the BESS, for instance, to charge the BESS.

In order to supply power to a power grid, the renewable energy power system and/or the energy storage system need to conform to certain requirements. For example, the renewable energy power system and/or the energy storage system may need to offer high-voltage ride through (HVRT) capability or low-voltage ride through (LVRT) capability. HVRT capability refers to the ability of a system to stay connected to the power grid during an over-voltage condition. Similarly, LVRT capability refers to the ability of a system to stay connected to the power grid during a low-voltage condition. Since either of these conditions in the power grid may cause issues with operation of a power converter, however, it is desirable to design energy systems so as to accommodate the high or low voltage events without damaging system components.

For example, various power systems have employed a dynamic brake having a brake chopper and a resistive element configured with the DC link capacitor to regulate the DC link voltage as described in U.S. Pat. No. 8,432,055 entitled "Wind Turbine Having a High-Voltage Ride Through (HVRT) Mode", which is incorporated herein by reference. In another example, a relatively large and bulky DC link capacitor having a relatively high breakdown voltage may be provided. In still a further example, if a power convertor employs semiconductor switches, such as insulated gate bipolar transistors (IGBTs) or integrated gate commutated thyristors (IGCTs), an over-voltage or over-current condition may exert stress or render the switches in the power converter inoperable. Accordingly, a line inductor that connects the power converter to the power grid may be provided having a relatively high voltage rating to protect the switches located in the power converter. However, providing large, bulky capacitors and inductors adds cost and complexity to the wind turbine.

In view of the foregoing, it would also be advantageous to provide improved HVRT or LVRT capability to energy storage systems and/or renewable energy power systems. Thus, the present disclosure is directed to a system and method for protecting a power converter of a stand-alone energy storage system and/or a power converter of a renewable energy power system during such an adverse voltage event.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method for protecting a power converter of a renewable energy power system connected to a power grid during an adverse voltage event. The method includes regulating, via a control system, a DC link voltage of a DC link of the power converter to a nominal range voltage. Another step includes monitoring, via the control system, the DC link voltage of the DC link. Based on the monitored DC link voltage, the method includes transferring energy, via a switching power supply from the DC link to one or more energy storage devices of the energy storage system when the DC link voltage surpasses a DC link rated voltage, wherein a voltage value above the DC link rated voltage is indicative of an adverse voltage event occurring at the power grid.

In one embodiment, the DC link rated voltage includes the greatest amount of voltage that the DC link is configured to withstand for a specified period of time while substantially ensuring operation of the DC link. In another embodiment, the step of monitoring the DC link voltage of the DC link further includes at least one of determining the actual DC link voltage via one or more sensors or estimating the actual DC link voltage via a computer model. In a further embodiment, the method includes transferring energy from the DC link to one or more energy storage devices of the energy storage system when the actual DC link voltage surpasses the DC link rated voltage until the DC link voltage is below the DC link rated voltage (i.e. returns to a voltage value below the DC link rated voltage).

In certain embodiments, the switching power supply includes a DC to DC power converter or similar. In further embodiments, the one or more energy storage devices include at least one of a battery storage device, a capacitor, a battery module, or similar. In another embodiment, the adverse voltage event may include at least one of a high-voltage ride through (HVRT) event or a low-voltage ride through (LVRT) event. In additional embodiments, the renewable energy power system may include at least one of a wind turbine power system, a solar power system, or any other suitable power system.

In another aspect, the present disclosure is directed to a method for protecting a power converter of a renewable energy power system connected to a power grid during an adverse voltage event. The method includes monitoring, via a control system, a current-voltage parameter of the power converter, wherein the current-voltage parameter is indicative of an adverse voltage event occurring at the power grid. Another step includes transferring, via a switching power supply, energy from a DC link of the power converter to one or more energy storage devices of an energy storage system coupled to the power converter when the current-voltage parameter indicates that an adverse voltage event is occurring.

In various embodiments, the current-voltage parameter may include at least one of a DC link voltage, a power grid voltage, a modulation index limit, a DC link current, a power grid current, or any other suitable parameter that is indicative of an adverse voltage event occurring in the power grid. Thus, in one embodiment, the method may also include transferring energy from the DC link to one or more energy storage devices of the energy storage system when the monitored DC link voltage surpasses a DC link rated voltage until the DC link voltage is equal to or below the DC link rated voltage. In a further embodiment, the DC link rated voltage includes the greatest amount of voltage that the DC link is configured to withstand for a specified period of time while substantially ensuring operation of the DC link. It should also be understood that the method may further include any of the additional steps and/or features as described herein.

In yet another aspect, the present disclosure is directed to a method for protecting a power converter of an energy storage system connected to a power grid during an adverse voltage event. The method includes monitoring, via a control system, a current-voltage parameter of the energy storage system, wherein the current-voltage parameter is indicative of an adverse voltage event occurring at the power grid. Another step includes transferring, via one or more switching elements, energy from a DC link of the energy storage system to one or more energy storage devices of the energy storage system when the current-voltage parameter indicates that an adverse voltage event is occurring.

In various embodiments, the current-voltage parameter may include at least one of a DC link voltage, a power grid voltage, a modulation index limit, a DC link current, a power grid current, or any other suitable parameter that is indicative of an adverse voltage event occurring in the power grid. In one embodiment, the adverse voltage event may include at least one of a high-voltage ride through (HVRT) event or a low-voltage ride through (LVRT) event. Further, in one embodiment, the one or more switching elements may include at least one insulated-gate bipolar transistor or any other suitable switching element. It should also be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
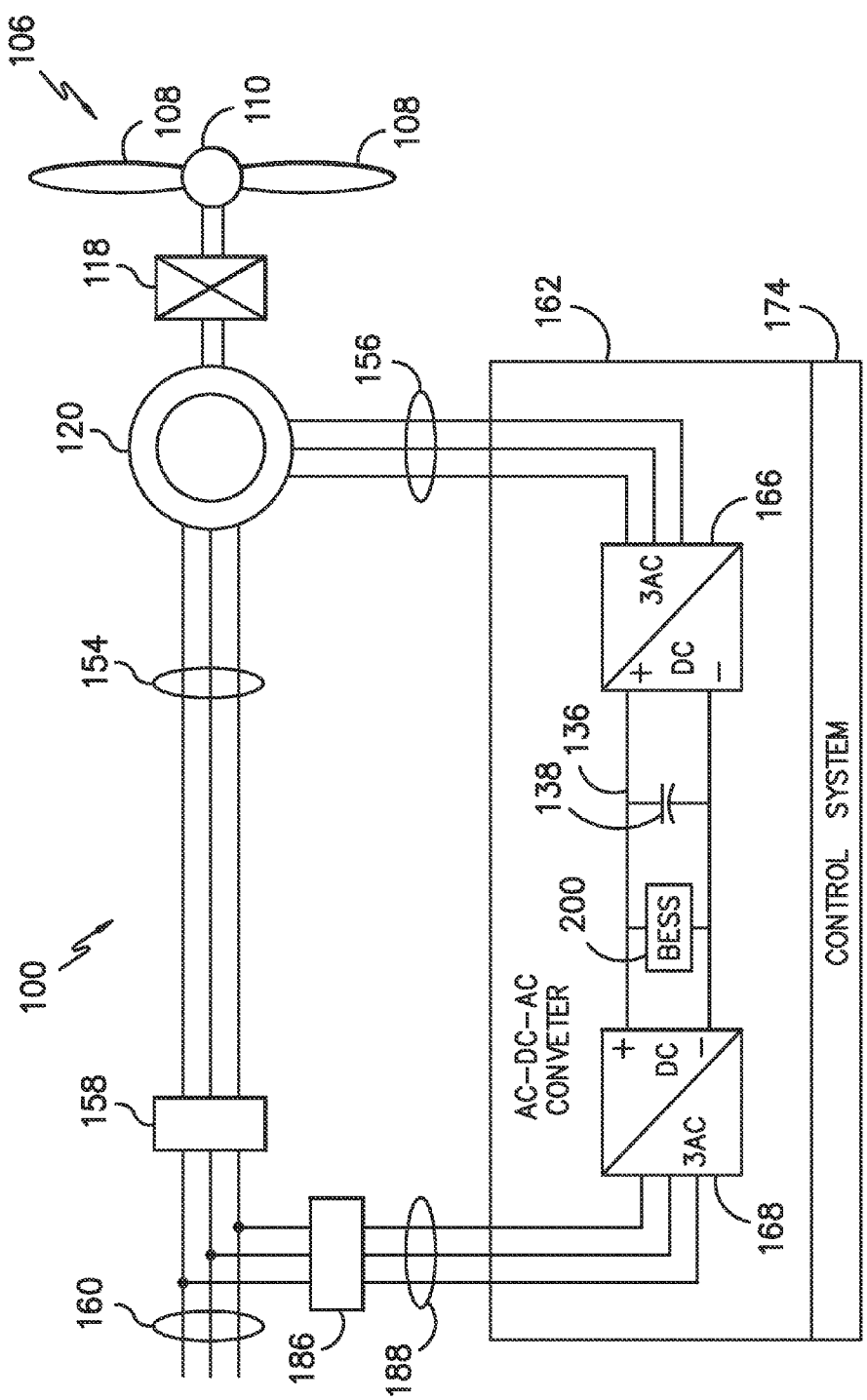
FIG. 1 illustrates one embodiment of an example renewable energy power system according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for providing high voltage ride through (HVRT) or low voltage ride through (LVRT) capability to a stand-alone battery energy storage system (BESS) coupled to a power grid or to a renewable energy power system coupled to the power grid. More particularly, in one embodiment, the BESS can be coupled to the DC link of a power converter of the renewable energy power system. For example, the BESS can be coupled to the DC link of an AC to DC to AC converter used in a wind energy power system. As another example, the BESS can be coupled to the DC link of a DC to DC to AC converter used in a solar energy system. The BESS typically includes one or more energy storage devices, such as a battery storage device, a capacitor, or any other suitable energy storage device. A switching power supply, e.g. a DC to DC power converter, can be coupled between the BESS and the DC link of the power converter for transferring energy therebetween.

More specifically, a control system can control the switching power supply to regulate power flow between the BESS and the DC link of the renewable energy power system. For example, the control system can be configured to regulate a DC link voltage to a nominal range voltage. The control system may also be configured to monitor the DC link voltage to ensure that the actual DC link voltage is within a certain percentage of the nominal range voltage. If the DC link voltage surpasses a certain voltage threshold (e.g. a DC link rated voltage, which is indicative of an adverse voltage event is occurring at the power grid), the control system is configured to transfer energy from the DC link to one or more energy storage devices of the BESS until the DC link voltage returns to a voltage value that is below the DC link rated voltage.

The present disclosure has many advantages not present in the prior art. For example, the present disclosure provides HVRT or LVRT capability to renewable energy power systems and/or energy storage systems without requiring additional hardware installation. Thus, the present disclosure provides reduced manufacturing and installation costs. In addition, the present disclosure provides improved energy absorption capability.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 10 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gear box 118, which is, in turn, coupled to a generator 120. In accordance with aspects of the present disclosure, the generator 120 may be any suitable generator, including, but not limited to a doubly fed induction generator (DFIG) or a fully fed induction generator. The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

Referring to the power converter 162, the DFIG 120 is coupled via the rotor bus 156 to a rotor-side converter 166. The rotor-side converter 166 is coupled to a line-side converter 168 which in turn is coupled to a line-side bus 188. In example configurations, the rotor-side converter 166 and the line-side converter 168 are configured for normal operating mode in a three-phase, pulse width modulation (PWM) arrangement using insulated gate bipolar transistor (IGBT) switching elements. The rotor-side converter 166 and the line-side converter 168 can be coupled via a DC link 136 across which is the DC link capacitor 138.

Figure 2:
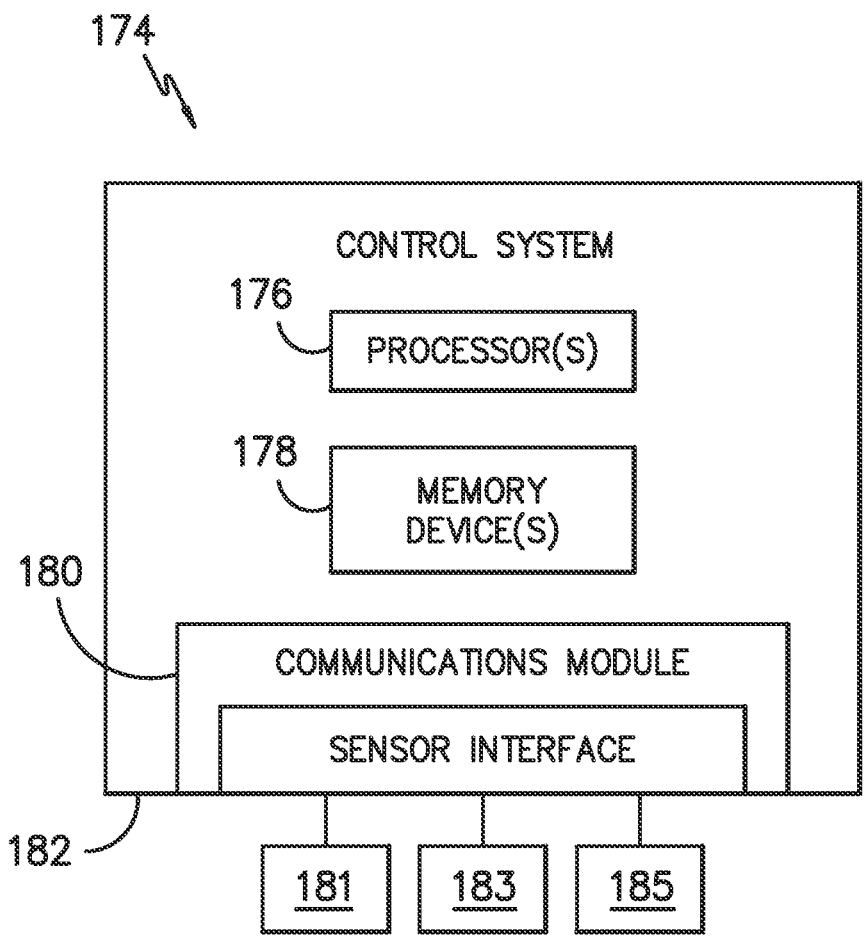
FIG. 2 illustrates a block diagram of one embodiment of a control system suitable for use with the renewable energy power system shown in FIG. 1.

The power converter 162 can be coupled to a control system 174 to control the operation of the rotor-side converter 166 and the line-side converter 168 and other aspects of the power system 100. For example, as shown particularly in FIG. 2, the control system 174 can include any number of control devices. In one implementation, for example, the control system 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching elements of the power converter 162 and other aspects of the power system 100. Additionally, the control system 174 may also include a communications module 180 to facilitate communications between the control system 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown in FIG. 2, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the control system 174 to perform the various functions as described herein.

In operation, alternating current power generated at the DFIG 120 by rotation of the rotor 106 is provided via a dual path to an electrical grid 160. The dual paths are defined by the stator bus 154 and the rotor bus 156. On the rotor bus side 156, sinusoidal multi-phase (e.g. three-phase) alternating current (AC) power is provided to the power converter 162. The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz).

Various circuit breakers and switches, such as a converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control system 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Still referring to FIG. 1, a battery energy storage system (BESS) 200 can be coupled to the power converter 162 of the power system 100. The present disclosure is discussed with reference to a battery energy storage system for purposes of illustration and discussion. Those of ordinary skill in the art, using the disclosures provided herein, should understand that aspects of the present disclosure are also applicable in other energy storage systems and different wind turbine configurations and/or power converter topologies. As shown in the illustrated embodiment, the battery energy storage system 200 can be coupled to the DC link 136 of the power converter 162 in parallel to control the DC link voltage. That is, the control system 174 may supply voltage to the DC link 136 until the DC link voltage reaches the DC link rated voltage. Once the DC link voltage reaches or is at least about equal to the DC link rated voltage, the control system 174 regulates the DC link voltage by transferring energy from the DC link 136 to the energy storage system 200. Further, the battery energy storage system 200 can be used to provide power to the DC link 136 under certain conditions. For instance, the battery energy storage system 200 can be used to provide power to the DC link 136 to increase output of the power system 100 when wind speed drops. Power can also be supplied and stored in the energy storage system 200 during operation of the DFIG system 100.

Figure 3:
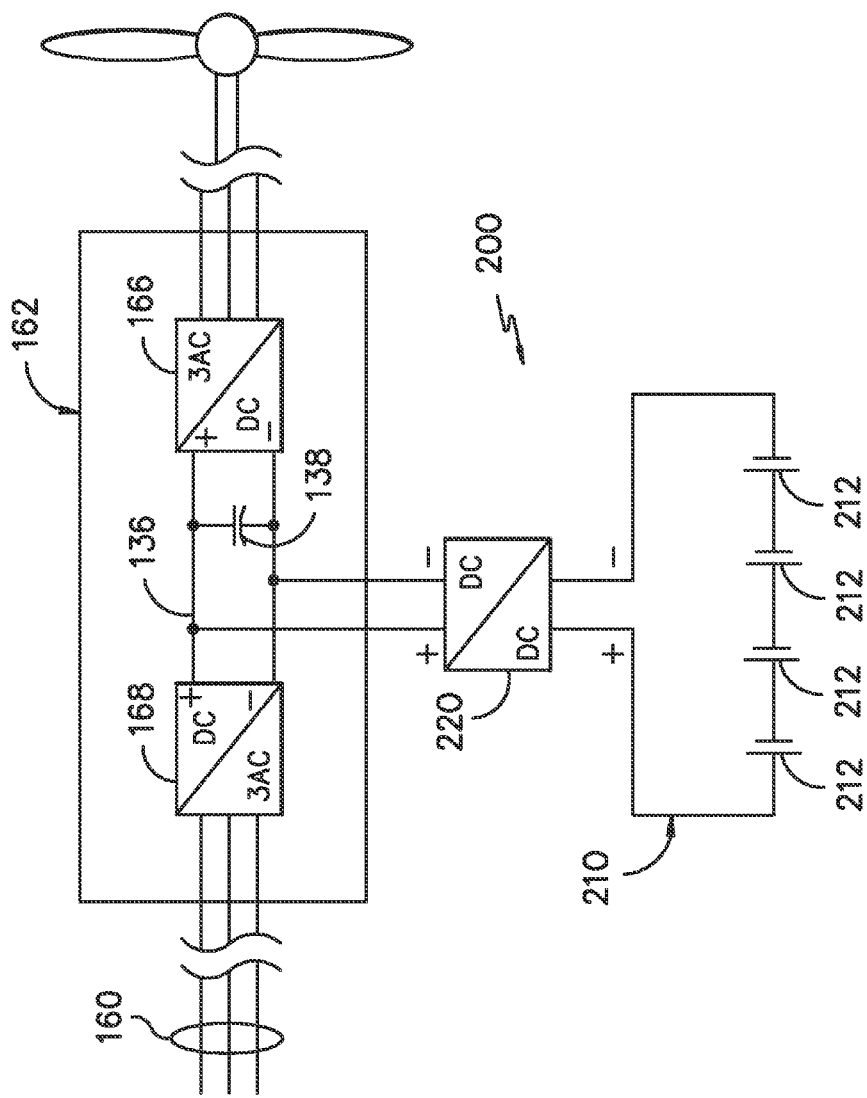
FIG. 3 illustrates one embodiment of an example energy storage system coupled to the DC link of a power converter according to the present disclosure.

Referring now to FIG. 3, an example battery energy storage system 200 coupled to the DC link 136 of a power converter 162 is illustrated. As shown, the energy storage system 200 can include one or more energy storage devices 212. More particularly, as shown, the energy storage system 200 includes four battery storage devices 212. In further embodiments, the energy storage system 200 may include more than four or less than four battery storage devices 212. In still additional embodiments, the energy storage system 200 may include at least one of a battery storage device, a capacitor, a battery module, or similar. Further, as shown in the illustrated embodiment, the battery energy storage system 200 can be coupled to the DC link 136 via a switching power supply 220, e.g. a DC to DC power converter. As such, the switching power supply 220 can convert the DC power on the DC link 136 to a DC voltage that is suitable for transfer to the energy storage system 200.

Figure 4:
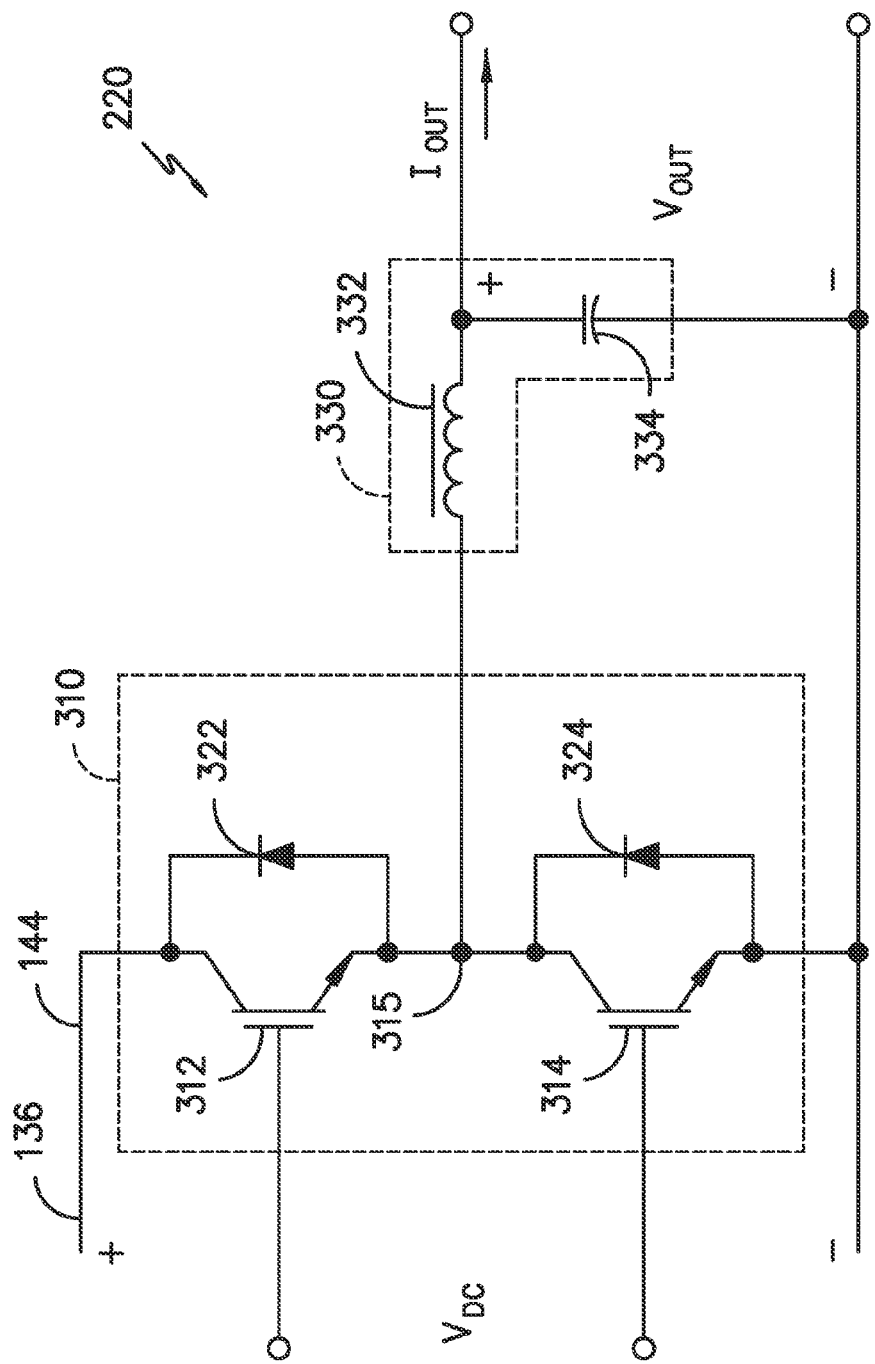
FIG. 4 illustrates one embodiment of example topology for a switching power supply for an energy storage system according to present disclosure.

Referring now to FIG. 4, example topology for the switching power supply 220 for the energy storage system 200 according to present disclosure is illustrated. As shown, the switching power supply 220 may include a bridge circuit 310 having one or more switching elements 312, 314 (e.g. IGBTs or other switching elements) coupled in series with one another. The switching elements 312, 314 can be controlled, for instance, by the control system 174 (FIGS. 1 and 2) to regulate power flow to the energy storage system 200. For example, during a high voltage ride through (HVRT) event, one of the plurality of switching elements 312, 314 can be controlled such that power flows in a first direction from the DC link 136 to the energy storage system 200 such that excess energy is transferred from the DC link 136 to the energy storage system 200, thereby maintaining the DC link voltage below a threshold voltage (i.e. the DC link rated voltage) so as to not damage system components.

It should be understood by those of ordinary skill in the art that the switching elements 312, 314 can be any suitable switching device, such as an IGBT, power MOSFET, or other suitable switching device. For instance, the one or more switching elements may include a first IGBT 312 having a gate, a collector, and an emitter. Another switching element may include a second IGBT 314 having a gate, a collector, and an emitter. In addition, the first IGBT 312 can be coupled to a first antiparallel diode 322 and the second IGBT 314 can be coupled to a second antiparallel diode 324. Further, the switching elements 312, 314 can be controlled to convert a first DC voltage $V_{DC}$ on the DC link 136 to a second DC voltage $V_{OUT}$ at the energy storage system 200. More particularly, pulse frequency modulation commands (e.g. gate drive commands) can be provided to one or more of the switching elements 312, 314 to adjust the operating frequency of the DC to DC power converter 220 to regulate power flow between the DC link 136 and the energy storage system 200.

Still referring to FIG. 4, the switching power supply 220 may also include a power filter or filtering circuit 330 coupled to the bridge circuit 310. The example switching power supply 220 of FIG. 4 is discussed with reference to the filtering circuit 330 being coupled to the negative terminal 146 of the DC link 136. Those of ordinary skill in the art, using the disclosures provided herein, will understand that the filtering circuit 330 can be coupled to the positive terminal 144 of the DC link 136 without deviating from the scope of the present disclosure. For instance, the capacitor 334 can be coupled between the second inductor 332 and the positive terminal 144 of the DC link 136.

More specifically, as shown, the filtering circuit 340 is typically an LC circuit that includes a dominant inductor 332 and a dominant capacitor 334. The inductor 332 can be coupled to a node 315 between the switching elements 312, 314. The capacitor 334 can be coupled between the inductor 332 and the negative terminal 146 of the DC link 136. The filtering circuit 330 can be used to filter the output of the bridge circuit 310 to provide a DC current $I_{out}$ and a DC link voltage $V_{out}$ to the energy storage system 200. In certain embodiments, the DC voltage $V_{out}$ can be the voltage across the capacitor 334. In additional embodiments, the DC link voltage $V_{out}$ typically corresponds to the excess voltage of the DC link 136 caused by an over-voltage condition at the power grid 160. As the over-voltage event is typically very short (e.g. in the range of 100-500 milliseconds), the energy storage system 200 is only marginally affected by the transfer of energy.

During operation, the control system 174 provides a nominal range voltage to the DC link 136 and regulates the DC link to the nominal range voltage. In one embodiment, the control system 174 also monitors an actual DC link voltage of the DC link 136 to ensure that the DC link voltage is within a certain percentage of the nominal range voltage. In another embodiment, the control system 174 is configured to monitor a current-voltage parameter of the power converter that is indicative of an HVRT event occurring at the power grid 160. For example, in certain embodiments, the current-voltage parameter may include at least one of a DC link voltage, a power grid voltage, a modulation index limit, a DC link current, a power grid current, or any other suitable parameter that is indicative of an adverse voltage event occurring in the power grid 160. Thus, in one embodiment, if the DC link voltage is about equal to or above a threshold voltage value or DC link rated voltage value, an over-voltage condition, e.g. a high-voltage ride through (HVRT) event, is likely occurring at the power grid 160.

In various embodiments, the value of the DC link rated voltage is the greatest amount of voltage that DC link 136 is configured or rated to withstand for a specified period of time, while substantially ensuring operation of DC link 136. In certain embodiments, the specified period of time is typically in the order of magnitude of about a couple hundred milliseconds, however, it should be understood that other period of time may be used as well. Thus, when the control system 174 detects that the current-voltage parameter indicates an over-voltage condition is occurring, e.g. the DC link voltage has surpassed the DC link rated voltage, the control system 174 begins to operate in an "over-voltage" mode. For example, in various embodiments, after selecting to operate in such a mode, the control system 174 is configured to transfer energy from the DC link 136 of the power converter 162 to one or more energy storage devices 212 of the energy storage system 200 via the switching power supply 220. In certain embodiments, when the control system 174 operates in the over-voltage mode, the power system 100 is required to stay connected to the power grid 160 during the over-voltage condition, however, the control system 174 is configured to prevent the DC link 136 from reaching an over-voltage condition, thereby protecting the power converter 162.

Figure 5:
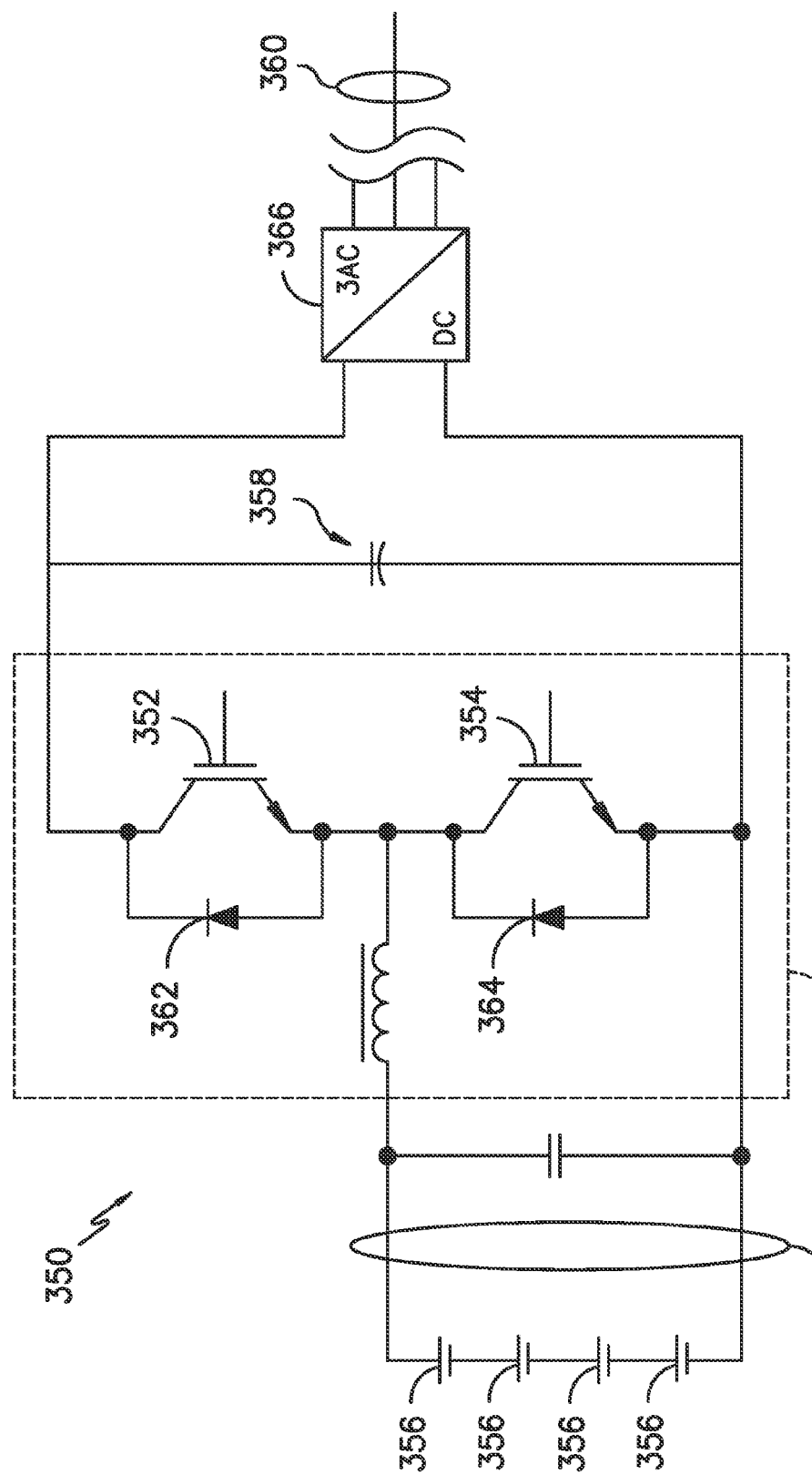
FIG. 5 illustrates one embodiment of an example stand-alone energy storage system according to present disclosure; and, FIG. 6 illustrates one embodiment of a flow diagram of an example method of operating an energy storage system according to the present disclosure.

Referring now to FIG. 5, an example stand-alone battery energy storage system (BESS) 350 connected to a power grid 360 via a switching power supply 366 is illustrated. As mentioned, the present disclosure is also directed to protecting a DC link 358 of the stand-alone BESS 350 and operates similar to the energy storage system 200 coupled to the power system 100 described above. For example, as shown in the illustrated embodiment, the stand-alone BESS 350 includes a plurality of energy storage devices 356. More particularly, as shown, the BESS 350 includes four battery storage devices 356 coupled in series. As mentioned, the energy storage devices 356 may include battery storage devices (e.g. batteries), capacitors, battery modules, or similar. The battery storage devices 356 are coupled to a bridge circuit 370 via a battery bus 368. In various embodiments, the bridge circuit 370 may include one or more switching elements 352, 354 (e.g. IGBTs or other switching elements) coupled in series with one another. The switching elements 352, 354 can be controlled, for instance, by the control system 174 (FIGS. 1 and 2) to regulate power flow to the BESS 350 from the DC link 358 during an over-voltage event. For example, during a high voltage ride through (HVRT) event, one of the plurality of switching elements 352, 354 can be controlled such that power flows in a first direction from the DC link 358 of the BESS 350 to one or more of the energy storage devices 356 such that excess energy is transferred from the DC link 358 to the energy storage devices 356, thereby maintaining the DC link voltage below the threshold voltage (i.e. the DC link rated voltage). Thus, the control system 174 is configured to operation the BESS 350 so as to protect BESS components from being damaged during an over-voltage event.

Figure 6:
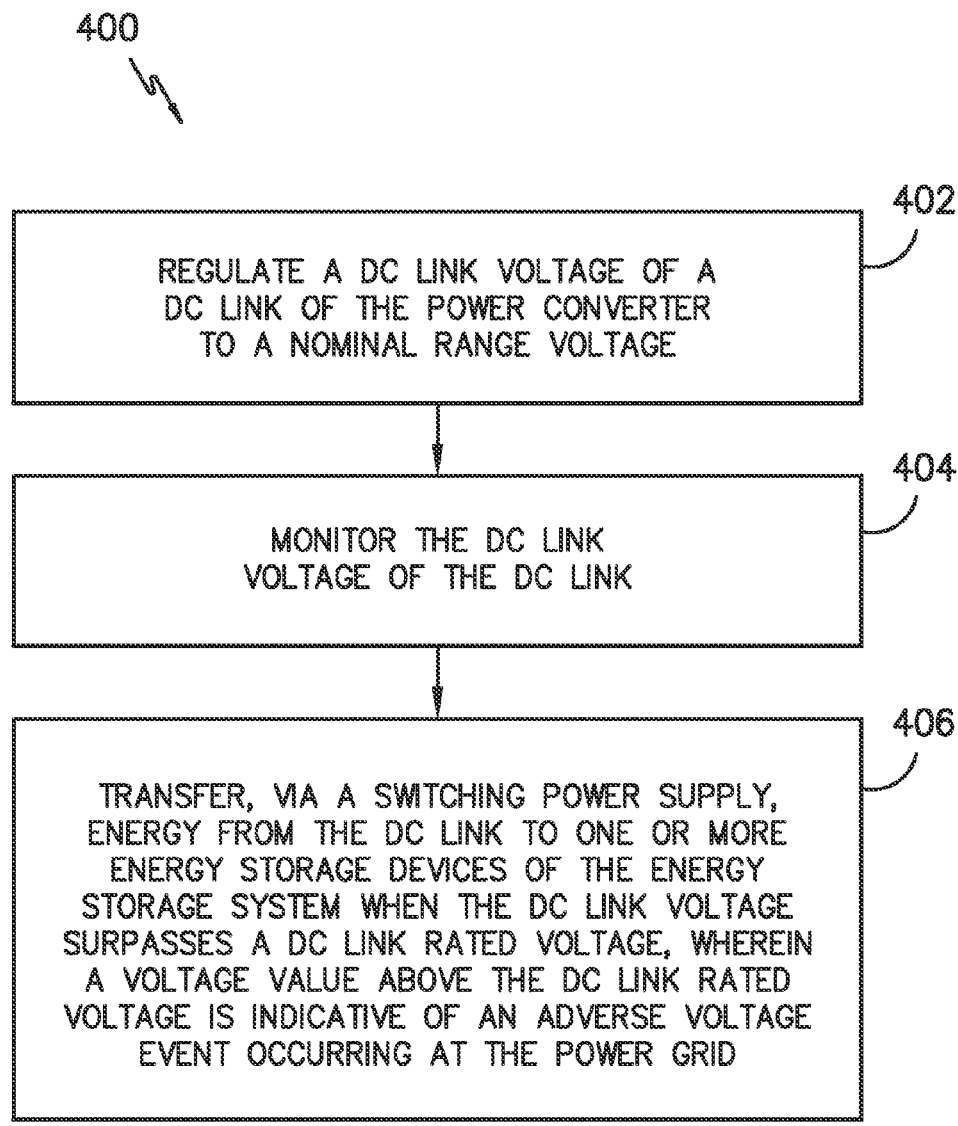

Referring now to FIG. 6, a flow diagram of an example method 400 for controlling a power converter of a renewable energy power system connected to a power grid during an adverse voltage event according to an example embodiment of the present disclosure is illustrated. Further, FIG. 6 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At (402), the method 400 includes regulating, via a control system, a DC link voltage of a DC link of the power converter to a nominal range voltage. At (404), the method 400 includes monitoring, via the control system, the DC link voltage of the DC link. At (406), the method 400 includes transferring energy from the DC link to one or more energy storage devices of the energy storage system when the DC link voltage surpasses a DC link rated voltage, wherein a voltage value above the DC link rated voltage is indicative of an adverse voltage event, such as an HVRT event, occurring at the power grid.

Exemplary embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for protecting a power converter of a renewable energy power system connected to a power grid during an adverse-voltage event, the method comprising:
    regulating, via a control system, a DC link voltage of a DC link of the power converter to a nominal range voltage;
    monitoring, via the control system, the DC link voltage of the DC link; and,
    transferring, via a switching power supply, energy from the DC link to one or more energy storage devices of an energy storage system when the DC link voltage surpasses a DC link rated voltage, wherein a voltage value above the DC link rated voltage is indicative of an adverse voltage event occurring at the power grid, and further wherein the energy storage system includes a plurality of energy storage devices, and wherein the plurality of energy storage devices is coupled to a bridge circuit comprising one or more switching elements coupled in series with one another and controlled by the control system.

2. The method of claim 1, wherein the DC link rated voltage comprises the greatest amount of voltage that the DC link is configured to withstand for a specified period of time while substantially ensuring operation of the DC link.

3. The method of claim 1, wherein monitoring the DC link voltage of the DC link further comprises at least one of determining the actual DC link voltage via one or more sensors or estimating the actual DC link voltage via a computer model.

4. The method of claim 1, further comprising transferring energy from the DC link to the one or more energy storage devices of the energy storage system when the actual DC link voltage surpasses the DC link rated voltage until the DC link voltage is equal to or below the DC link rated voltage.

5. The method of claim 1, further comprising monitoring a storage capacity of the energy storage devices to ensure the storage capacity is capable of receiving energy from the DC link.

6. The method of claim 1, wherein the switching power supply comprises a DC to DC power converter.

7. The method of claim 1, wherein the one or more energy storage devices further comprise at least one of a battery storage device, a capacitor, or a battery module.

8. The method of claim 1, wherein the adverse voltage event comprises at least one of a high-voltage ride through (HVRT) event or a low-voltage ride through (LVRT) event.

9. The method of claim 1, wherein the renewable energy power system comprises at least one of a wind turbine power system or a solar power system.

10. A method for protecting a power converter of a renewable energy power system connected to a power grid during an adverse voltage event, the method comprising:
    monitoring, via a control system, a current-voltage parameter of the power converter, wherein the current-voltage parameter is indicative of an adverse voltage event occurring at the power grid; and,
    transferring, via a switching power supply, energy from a DC link of the power converter to one or more energy storage devices of an energy storage system coupled to the power converter when the current-voltage parameter indicates that an adverse voltage event is occurring, and further wherein the energy storage system includes a plurality of energy storage devices, and wherein the plurality of energy store devices is coupled to a bridge circuit comprising one or more switching elements coupled in series with one another and controlled by the control system.

11. The method of claim 10, wherein the current-voltage parameter comprises at least one of a DC link voltage, a power grid voltage, a modulation index limit, a DC link current, or a power grid current.

12. The method of claim 11, further comprising:
    monitoring a storage capacity of the energy storage devices to ensure the storage capacity is capable of receiving energy from the DC link; and
    transferring energy from the DC link to one or more energy storage devices of the energy storage system when the DC link voltage surpasses a DC link rated voltage until the DC link voltage is equal to or below the DC link rated voltage.

13. The method of claim 12, wherein the DC link rated voltage comprises the greatest amount of voltage that the DC link is configured to withstand for a specified period of time while substantially ensuring operation of the DC link.

14. The method of claim 10, wherein the switching power supply comprises a DC to DC power converter.

15. The method of claim 10, wherein monitoring the current-voltage parameter further comprises at least one of determining the current-voltage parameter via one or more sensors or estimating the current-voltage parameter via a computer model.

16. The method of claim 10, wherein the adverse voltage event comprises at least one of a high voltage ride through (HVRT) event or a low-voltage ride through (LVRT) event.

17. A method for protecting a power converter of an energy storage system connected to a power grid during an adverse voltage event, the method comprising:
    monitoring, via a control system, a current-voltage parameter of the energy storage system, wherein the current-voltage parameter is indicative of an adverse voltage event occurring at the power grid; and,
    transferring, via one or more switching elements, energy from a DC link of the energy storage system to one or more energy storage devices of the energy storage system when the current-voltage parameter indicates that an adverse voltage event is occurring and further wherein the energy storage system includes a plurality of energy storage devices coupled in series, and wherein the plurality of energy storage devices is coupled to a bridge circuit comprising one or more switching elements coupled in series with one another and controlled by the control system.

18. The method of claim 17, wherein the current-voltage parameter comprises at least one of a DC link voltage, a power grid voltage, a modulation index limit, a DC link current, or a power grid current.

19. The method of claim 17, wherein the adverse voltage event comprises at least one of a high voltage ride through (HVRT) event or a low-voltage ride through (LVRT) event.

20. The method of claim 17, wherein the one or more switching elements comprise at least one insulated-gate bipolar transistor.

* * * * *

UNITED STATES PATENT AND TRADEMARK OFFICE
CERTIFICATE OF CORRECTION

PATENT NO. : 9,667,057 B2  
APPLICATION NO. : 14/307896  
DATED : May 30, 2017  
INVENTOR(S) : Robert Roesner and Mathieu Giroux Page 1 of 1

It is certified that error appears in the above-identified patent and that said Letters Patent is hereby corrected as shown below:

In the Claims

Claim 10 (Column 12, Line 4):
-- plurality of energy store devices is coupled to a bridge -- should read -- plurality of energy storage devices is coupled to a bridge --

Signed and Sealed this
First Day of May, 2018

Andrei Iancu
*Director of the United States Patent and Trademark Office*